United States Patent
Kim et al.

(10) Patent No.: US 9,709,167 B2
(45) Date of Patent: Jul. 18, 2017

(54) SHIFT CONTROL METHOD AND SYSTEM FOR HYBRID VEHICLE

(71) Applicant: Hyundai Motor Company, Seoul (KR)

(72) Inventors: Sang Joon Kim, Seoul (KR); Chan Ho Lee, Gangdong-Gu (KR); Joon Young Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 136 days.

(21) Appl. No.: 14/839,021

(22) Filed: Aug. 28, 2015

(65) Prior Publication Data
US 2016/0109021 A1    Apr. 21, 2016

(30) Foreign Application Priority Data
Oct. 17, 2014    (KR) .......................... 10-2014-0140460

(51) Int. Cl.
*F16H 61/16*    (2006.01)
*B60W 20/30*    (2016.01)
(Continued)

(52) U.S. Cl.
CPC ............. *F16H 61/16* (2013.01); *B60W 20/30* (2013.01); *F16H 61/0213* (2013.01); *B60W 10/10* (2013.01); *B60W 2520/00* (2013.01); *B60W 2540/30* (2013.01); *B60W 2710/1005* (2013.01); *F16H 31/00* (2013.01); *F16H 61/061* (2013.01);
(Continued)

(58) Field of Classification Search
CPC .. B60W 10/10; B60W 20/30; B60W 2540/30; B60W 2520/00; B60W 2710/1005; F16H 31/00; F16H 61/40; F16H 61/16
See application file for complete search history.

(56) References Cited

U.S. PATENT DOCUMENTS 5,385,515 A * 1/1995 Chan ..................... B60W 10/06
                                                          477/75
5,425,689 A * 6/1995 Genise ................ B60W 10/196
                                                 477/118
(Continued)

FOREIGN PATENT DOCUMENTS

JP        2004-204957 A    7/2004
KR    10-1998-0048334 A    9/1998
(Continued)

*Primary Examiner* — Behrang Badii
(74) *Attorney, Agent, or Firm* — Mintz Levin Cohn Ferris Glovsky and Popeo, P.C.; Peter F. Corless

(57) ABSTRACT

A shift control method and system for a hybrid vehicle are provided to increase the recovery rate of regenerative energy, improve the fuel efficiency, and minimize the loss of the fuel efficiency upon reaccelerating after braking. The method include: acquiring in real-time information regarding a transmission input speed during driving and sensing a brake pedal operation. In addition, whether a road driving situation or a driver tendency corresponds to a skip shift allowable condition is detected when the brake pedal operation is sensed. A target shift stage to which a skip shift of two or more stages is performed is selected from a current shift stage based on the transmission input speed in real-time, when the road driving situation or the driver tendency corresponds to the skip shift allowable condition. Then a transmission is operated to shift to the selected target shift stage.

18 Claims, 7 Drawing Sheets

(51) Int. Cl.
 *F16H 61/02* (2006.01)
 *F16H 31/00* (2006.01)
 *B60W 10/10* (2012.01)
 *F16H 61/06* (2006.01)
 *F16H 61/40* (2010.01)

(52) U.S. Cl.
 CPC ...... *F16H 61/40* (2013.01); *F16H 2061/0234* (2013.01); *F16H 2306/14* (2013.01); *Y10S 903/945* (2013.01)

(56) References Cited

U.S. PATENT DOCUMENTS

2005/0267665 A1* 12/2005 Iwatsuki .................. B60T 7/12
 701/70
2010/0105521 A1* 4/2010 Kondo .................. F16H 61/061
 477/115

FOREIGN PATENT DOCUMENTS

| | | |
|---|---|---|
| KR | 10-1999-0026711 A | 4/1999 |
| KR | 10-1999-0053678 A | 7/1999 |
| KR | 10-20020083225 | 11/2002 |
| KR | 10-20050115639 | 12/2005 |
| KR | 1020110048690 | 5/2011 |
| KR | 1020130042213 | 4/2013 |

* cited by examiner

SHIFT CONTROL METHOD AND SYSTEM FOR HYBRID VEHICLE

CROSS-REFERENCE TO RELATED APPLICATION

This application claims under 35 U.S.C. §119(a) the benefit of Korean Patent Application No. 10-2014-0140460 filed Oct. 17, 2014, the entire contents of which are incorporated herein by reference.

BACKGROUND

Technical Field

The present invention relates to a shift control method and system for a hybrid vehicle, and more particularly, to a shift control method and system for a hybrid vehicle, that increases the recovery rate of regenerative energy, improves the fuel efficiency, and minimizes the loss of the fuel efficiency upon reaccelerating after braking.

Background Art

A hybrid vehicle using an engine and a motor as driving sources is an eco-friendly vehicle which reduces exhaust gases and improves fuel efficiency. As illustrated in FIG.1, in addition to an engine 1 and a drive motor 3 operating as driving sources for driving of the vehicle, the hybrid vehicle includes an engine clutch 2 interposed between the engine 1 and the drive motor 3, a transmission 4 connected to the output side of the drive motor 3, an inverter 5 configured to drive the drive motor 3, and a battery 6 operating as a power source of the drive motor 3 and connected to the drive motor 3 to be charged and discharged through the inverter 5.

Reference number 7 in FIG.1 illustrates a Hybrid Starter and Generator (HSG) power-transmittably connected to the engine 1 to start the engine may be started or to generate electricity by the driving power of the engine. The engine clutch 2 is configured to selectively engage or disengage power transmission between the engine 1 and the drive motor 3 through hydraulic coupling or decoupling, and the inverter 5 is configured to convert a direct current of the battery 6 into a three-p alternating current to apply to the drive motor 3.

Additionally, the transmission 4 is connected to the power output side of the drive motor 3, and is configured to shift and deliver driving power of the engine and the motor to a drive shaft. Such hybrid vehicles either drive in Electric Vehicle (EV) mode, which is purely an electric vehicle mode using the driving power of the drive motor 3, or in Hybrid Electric Vehicle (HEV) mode which uses both driving powers of the engine 1 and the drive motor 3.

Furthermore, during the braking or coasting by inertia, Regenerative Braking (RB) is performed in which inertial energy of a vehicle is recovered by the electricity generating action of the motor to charge the battery (motor charging). A hybrid vehicle is also mounted with a hybrid controller (Hybrid Control Unit (HCU)) as an uppermost controller configured to operate the vehicle, and includes a variety of controllers designed for various devices on the vehicle.

Examples of such controllers include an engine controller (Engine Control Unit (ECU)) configured to operate the engine, a motor controller (Motor Control Unit (MCU)) configured to operate the motor, a transmission controller (Transmission Control Unit (TCU)) configured to operate the transmission, a Battery Management System (BMS) for configured to collect data regarding the state of the battery to use for executing charging and discharging of the battery or to provide to other controllers, and a brake controller configured to execute braking of the vehicle.

The HCU and other controllers exchange data via Controller Area Network (CAN) communication to perform cooperative control. An upper controller is configured to collect various data from lower controllers and transmit control commands to the lower controllers. A hybrid vehicle is also equipped with an Electric Oil Pump (EOP) configured to feed (e.g., supply) hydraulic fluid required for the driving of the engine clutch and the transmission, and a pump controller configured to operate the EOP. The pump controller is disposed to exchange data with an upper controller, i.e., TCU via CAN communication and to operate the EOP based on the control commands applied by the TCU.

Brief description of major functions of controllers involving in regenerative braking in a typical hybrid vehicle is that the hybrid controller is configured to determine regenerative braking command by considering regeneration prohibition conditions and is configured to estimate regenerative braking performance based on the states of the drive motor and the transmission. The brake controller is configured to calculate a required total braking power by the driver's demand (brake pedal operation) and divide between regenerative braking and friction braking to meet the required total braking power by referring to regenerative braking performance transmitted from the hybrid controller.

The brake controller is configured to transmit, to the HCU, the data regarding the regenerative braking allowance obtained as a result of the distribution to be used for the determination of regenerative braking commands, and execute the control on brakes (frictional braking device) to generate a distributed frictional braking force. The MCU is configured to operate the drive motor through the inverter following the regenerative braking command from the hybrid controller, and transmit data regarding motor output torque and others to the hybrid controller to allow the hybrid controller to estimate regenerative braking performance.

The TCU is configured to execute shift control over multi-stage transmission such as Automatic Transmission (AT) and Dual Clutch Transmission (DCT), and transmit data regarding transmission state and others to the hybrid controller to allow the HCU to estimate regenerative braking performance and determine regenerative braking command.

For a hybrid vehicle mounted with a multi-stage transmission, a torque intervention control is performed to reduce a charging torque (e.g., generation torque or regenerative braking torque) during the shift process. Additionally, for a hybrid vehicle mounted with a multi-stage transmission, a regenerative energy difference occurs by shift stage and shift control, where the absolute value of drive motor torque (torque here means motor charging torque which is negative value) reduces by the torque intervention during the transmission process and so does regenerative power. Accordingly, when continuous sequential shifts occur during the braking, motor charging torque is reduced at each transmission shift, thus causing a significant reduction of the total regenerative power.

When further elaborated on the above, FIG. 2 is an exemplary view illustrating a motor speed and a motor torque during a shift process of regenerative braking. The figure shows an example of shift of 5→4→3 stages. When the transmission shifts to low stages during regenerative braking in a related art, a one-stage shift lower is sequentially performed as the speed of the vehicle decreases. Accordingly, a torque intervention occurs at each transmission shift to reduce the absolute value of motor torque (which is a charging torque and has a negative value) which interrupts increase of transmission input speed (e.g., motor speed).

Thus, the charging torque is reduced by the torque intervention, and further loss follows with further transmission events. In a situation of frequent transmission shifts, a loss in recovered energy occurs during regenerative braking since charging power (e.g., regenerative power) decreases as charging torque reduces by torque intervention. For a vehicle driven by the electric oil pump among hybrid vehicles mounted with an automatic transmission, a pump drive loss occurs by a maximum line pressure control at each transmission shift. In other words, when an oil pump of electric motor type is driven for transmission shift, a decrease in fuel efficiency occurs due to an increase of operation energy and power consumption (see FIG. 2) for the EOP since a maximum line pressure control is necessary each time of transmission shift.

Accordingly, it is advantageous in fuel efficiency to perform a skip shift by more than two stages by which to avoid consecutive one-stage transmission shift and to reduce frequency of transmission shifts. However, the skip shift has disadvantage in terms of Shift Quality (SQ) and reacceleration fuel efficiency when the vehicle restarts by minimal accelerator opening degree after braking which may cause loss in fuel efficiency since the engine runs at a substantially high revolutions per minute (rpm) for low shift stage when the vehicle accelerates again.

The above information disclosed in this section is merely for enhancement of understanding of the background of the invention and therefore it may contain information that does not form the prior art that is already known in this country to a person of ordinary skill in the art.

SUMMARY

The present invention provides to a shift control method and system for a hybrid vehicle, which may increase the recovery rate of regenerative energy, improve the fuel efficiency, and minimize the loss of the fuel efficiency upon reaccelerating after braking.

In one aspect, the present invention provides a shift control method for a hybrid vehicle which may include: acquiring in real-time information regarding a transmission input speed during driving, and sensing a brake pedal operation of a driver; detecting whether a road driving situation or a driver's tendency corresponds to a skip shift allowable condition when the brake pedal operation of a driver is sensed; selecting a target shift stage to which a skip shift of two or more stages is performed from a current shift stage based on the transmission input speed in real-time, when the road driving situation or the driver's tendency corresponds to the skip shift allowable condition; and operating a transmission such that a shift is performed to the selected target shift stage.

In an exemplary embodiment, the number of kick-downs during past N driving cycles may be counted, and when a driver has a tendency of rapid acceleration in which the average number of kick-downs is greater than a predetermined value 1 (e.g., number of accelerator engagements), the skip shift allowable condition may be set such that the skip shift is allowed. In another exemplary embodiment, when a driver has a tendency of rapid deceleration in which an average value of the depths of the brake pedal operation in a braking section sensed through a sensor during past N driving cycles is greater than a predetermined value 2 (e.g., number of brake pedal engagements), the skip shift allowable condition may be set such that the skip shift is allowed.

In still another exemplary embodiment, when a vehicle is driven at a substantially low speed in which an average running speed on a road on which a vehicle travels is less than a predetermined value 3, the skip shift allowable condition may be set such that the skip shift is allowed. In addition, the average running speed on the road may be received from the exterior through an in-vehicle device (e.g., received from a device extraneous to the vehicle), and may be compared with the predetermined value 3. In still yet another exemplary embodiment, the average running speed of a vehicle may be calculated after a vehicle starts running, and may be compared with the predetermined value 3.

Furthermore, the selection of the target shift stage may include: while a maximum transmission input speed at which the transmission is shiftable to a corresponding shift stage by each shift stage is designated, selecting shift stage candidates in which the transmission input speed in real-time falls within the maximum transmission input speed; and then selecting a target shift stage based on the depth of the brake pedal operation from the shift stage candidates.

In another further exemplary embodiment, the shift control method, after the selection of the shift stage candidates in which the transmission input speed in real-time falls within the maximum transmission input speed, may include: determining shift stages to which the shift is impossible from a current shift stage in accordance with the characteristics of an automatic transmission or Double Clutch Transmission (DCT); additionally removing, from the shift stage candidates, the shift stages to which the shift is impossible, to select final shift candidates; and selecting a target shift stage from the final shift stage candidates.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
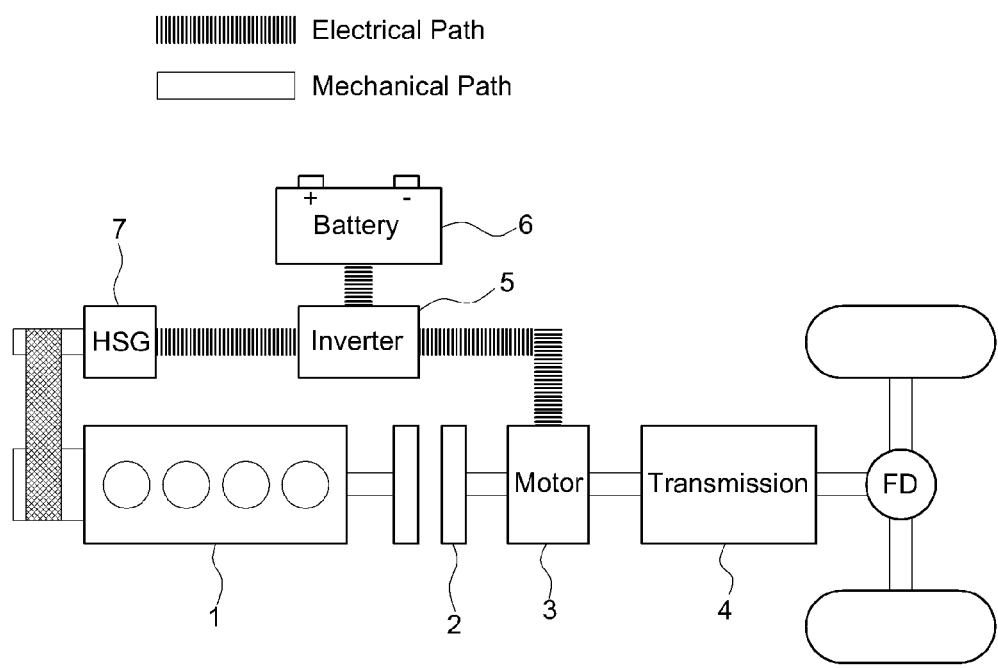
FIG. 1 is an exemplary view illustrating a power train of a hybrid vehicle according to the related art.

Reference numerals set forth in the Drawings includes reference to the following elements as further discussed below:

1: engine
2: engine clutch
3: drive motor
4: transmission
5: inverter
6: battery
7: HSG It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, exemplary embodiments of the present invention will be described in detail with reference to the accompanying drawings so that those skilled in the art can easily carry out the present invention. The present invention provides to a shift control method for a hybrid vehicle, which may increase the recovery rate of regenerative energy, improve the fuel efficiency, and minimize the loss of the fuel efficiency upon reaccelerating after braking.

Accordingly, the present invention provides a method and system of limitedly allowing a skip shift by determining a driver's tendency and a road driving situation having a fuel efficiency gain through skip shift and determining a situation where low speed/low shift stage driving such as downtown driving is mainly performed and a driver's tendency performing rapid deceleration or acceleration causing kink down.

Figure 2:
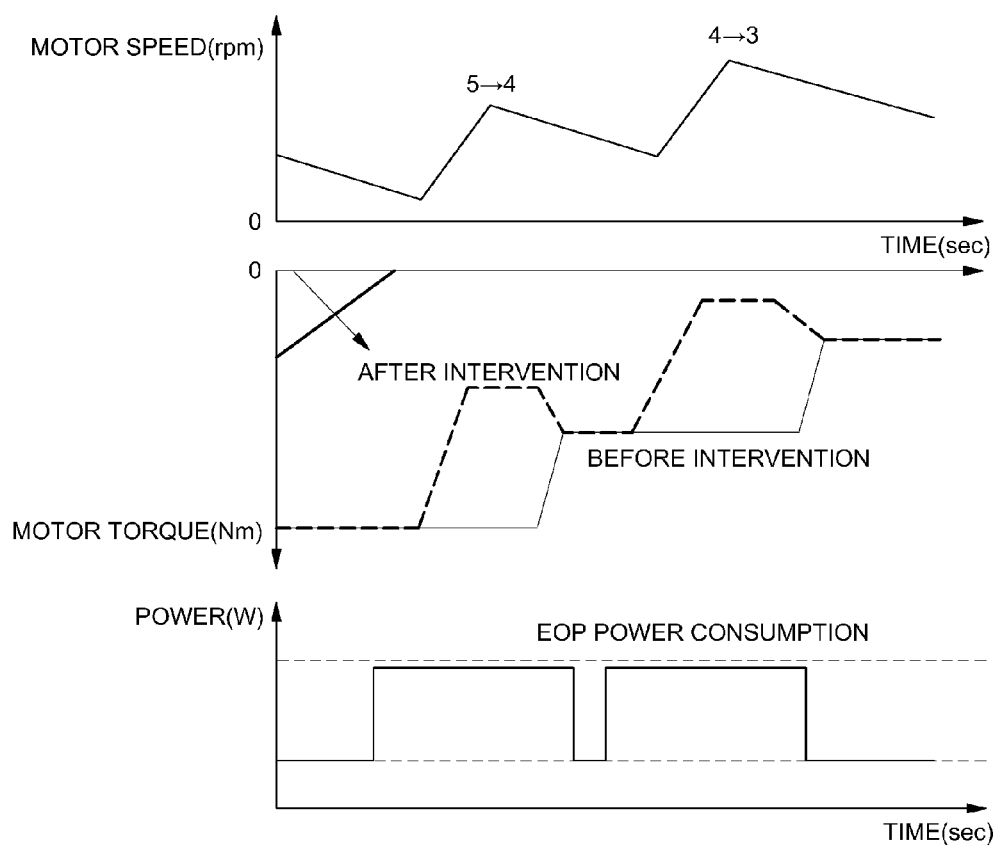
FIG. 2 is an exemplary view illustrating a motor speed and a motor torque during a shift process of regenerative braking according to the related art.
Figure 3:
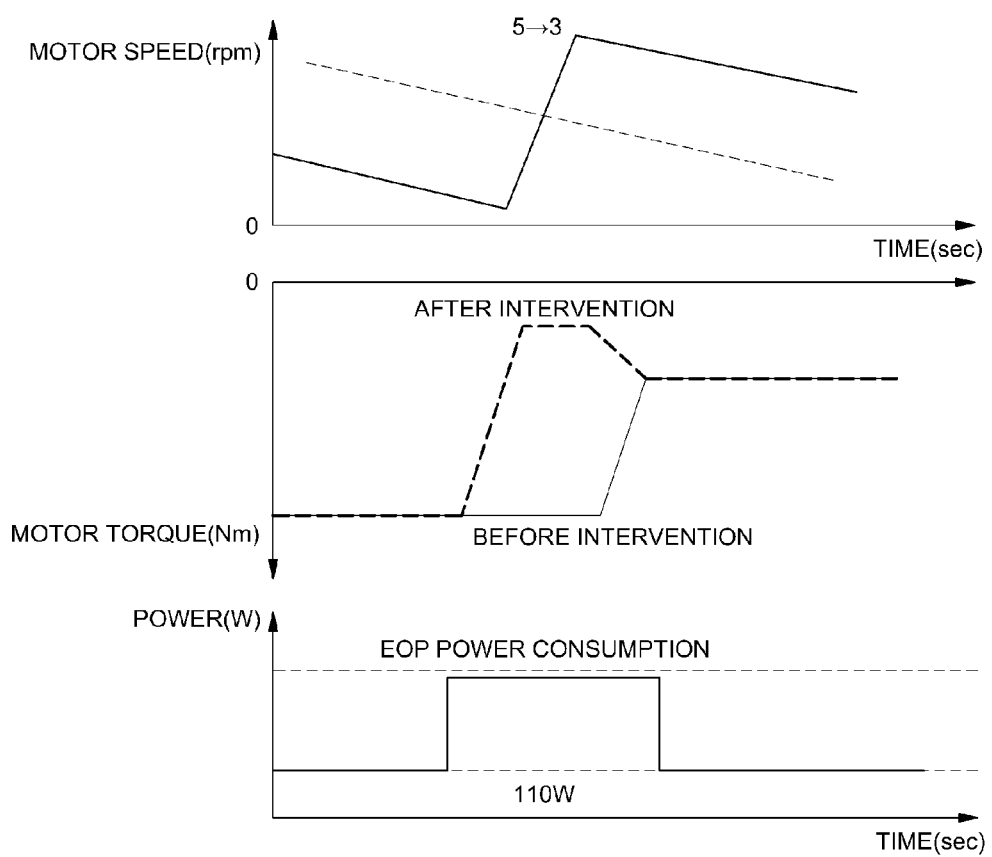
FIG. 3 is an exemplary view illustrating a skip shift state according to an exemplary embodiment of the present invention.
Figure 4:
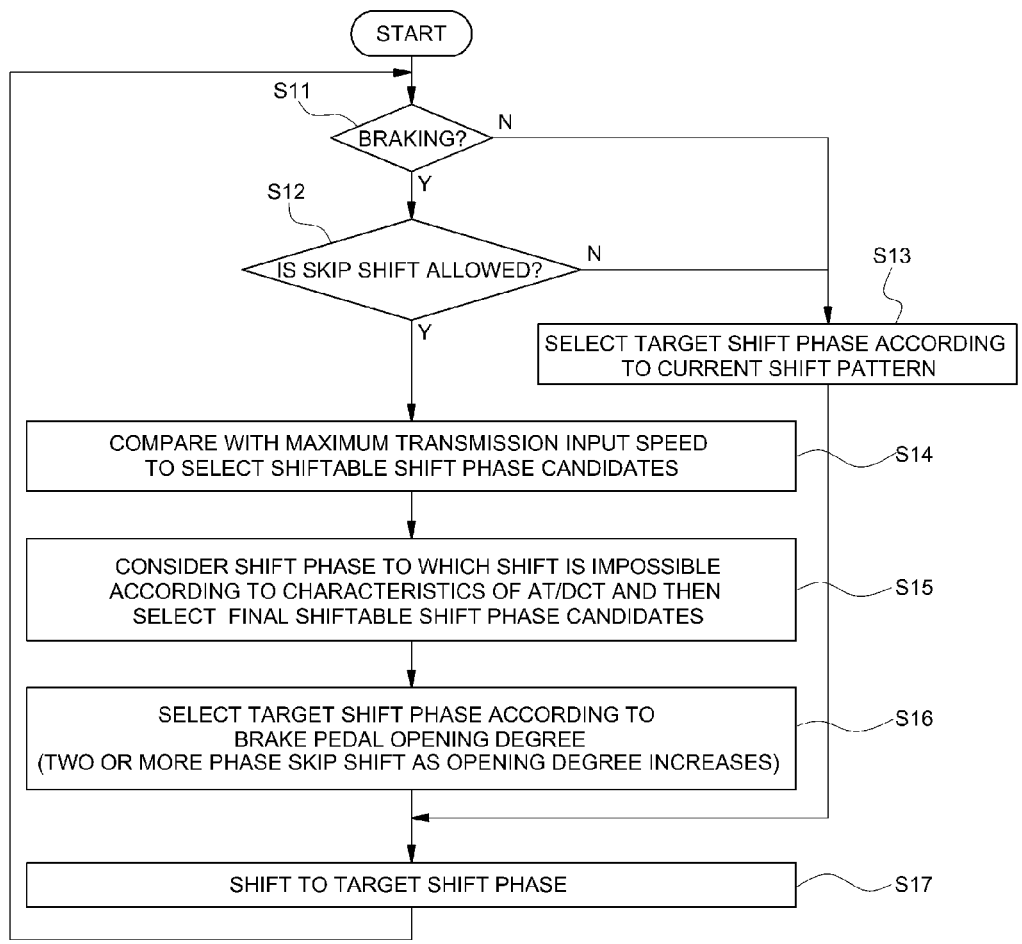
FIG. 4 is an exemplary flowchart illustrating a shift control process according to an exemplary embodiment of the present invention.

FIG. 3 is an exemplary view illustrating a skip shift state according to an exemplary embodiment of the present invention, which corresponds to FIG. 2 showing a typical case where continuous sequential shift is performed in a regenerative braking situation according to the related art. Also, FIG. 4 is an exemplary flowchart illustrating a shift control process according to an exemplary embodiment of the present invention. Unlike continuous sequential shift, i.e., the fifth stage→the fourth stage→the third stage one by one as shown in FIG. 2, referring to FIG. 3, a single two stage shift, i.e., two stage skip shift, the fifth stage→the third stage may be performed in the same regenerative braking situation.

Thus, according to the skip shift in which the multi-stage shift is performed through one shift control, the number of shift events occurring to reach the third stage to be targeted may be reduced compared to the one-by-one sequential shift. Particularly, in case of single two-stage shift, the number of motor torque intervention events is less than the one-by-one sequential shift, and since the stage difference is greater during the shift, the motor speed (rpm) may be maintained substantially high, enabling the maintenance of high charging power (e.g., regenerative power). Accordingly, the recovery rate of regenerative energy may increase.

Additionally, for an automatic transmission vehicle in which an electric oil pump is driven, since the number of maximum line pressure controls decreases as the number of shift events decreases, the operation energy and the power consumption of the electric oil pump may be reduced. Accordingly, it is advantageous for the improvement of the recovery rate of regenerative energy and the improvement of the fuel efficiency to perform skip shift during the braking.

However, in case of skip shift in which a single two- or more-stage shift is performed during the braking, a busy shift may frequently occur in which a continuous sequential shift to a shift stage that corresponds to a current vehicle speed in accordance with a vehicle speed-based basic shift pattern when a driver releases the brake. In other words, when the shift stage that corresponds to the current vehicle speed is the fifth stage based on the shift pattern, when a skip shift to the third stage is performed by braking and then the braking is released, a sequential shift, i.e., third stage→fourth stage→fifth stage may frequently occur.

Accordingly, to minimize the limitation of the foregoing busy shift, whether to perform the two- or more-stage skip shift and the sequential shift based on the braking demand (e.g., brake pedal opening degree or engagement degree) of a driver during the braking may be determined, and it may be necessary to perform the sequential shift and the two- or more-stage skip shift based on the driving situation and the driver's tendency (in relation to acceleration and deceleration engagement tendencies). Further, since the maximum input speed of a transmission may be designated to perform a shift to the that corresponds shift stage by each shift stage, a shift stage candidate (e.g., shift stage candidate skip-shiftable from current shift stage) falling within the maximum input speed of the transmission designated with a current transmission input speed may be determined when a target shift stage of skip shift is determined, thus allowing the target shift stage to be finally determined with respect to the shift stage candidate.

In other words, the skip shift may be performed into one of the shift stages in which the current transmission input speed falls within the maximum transmission input speed. The transmission input speed may be a limited speed range for protecting a system, and the shift may be allowed to the shift stages falling within the maximum input speed that corresponds to each shift stage. In addition, shift stages to which the shift is impossible from the current shift stage based on the characteristics of the automatic transmission or Double Clutch Transmission (DCT) may be determined, and then the shift stage to which the shift is impossible may be additionally removed to select a final shiftable shift stage candidate.

For a vehicle mounted with a DTC, there may be a limitation in shift stages (e.g., target shift stage) to which the skip shift may be performed from the current shift stage. In other words, the DCT is a manual transmission-based automated manual transmission that may be configured to automatically execute clutch operation and gear shift using two clutches. Particular, the DCT may be configured to automatically perform clutch operation and gear shift with two clutches, and automatically execute clutch operation and gear shift using the total two clutches which take charge of odd number gears and even number gears, respectively.

For example, when one clutch shifts the stage, the other clutch may adjust a gear into the next stage to perform shifting. Assuming that the gear shift is performed into first, third, and fifth stages by the operation of one clutch and is performed into second, fourth, and sixth stages by the operation of the other clutch, the sequential shift may be performed in the order of 6→5→4→3→2→1 stages by the alternate operation of the two clutches. In other words, the transmission shift may be impossible between two stages which the same clutch operates (e.g., single shift from an odd number stage to another odd number stage or from an even number stage to another even number stage).

Based on the characteristics of the DCT, this is applied to a case where skip shift is performed. For example, skip shift of 6→4, 4→2, 5→3, or 3→1 may be impossible, and skip shift of 6→3, 5→2, or 4→1 which is the stage shift by the alternate operation of two clutches may be possible. Thus, for the DCT, there exist shift stages that are shiftable based on the system characteristics, and whether there is a limitation of the shift stages that are shiftable from the current shift stage may be determined when the target shift stage to be skip-shifted is determined. In particular, when the target shift stage is determined, the shift stage candidate may be selected based on the maximum transmission input speed by each shift stage from the current shift stage, and the final shiftable target shift stage candidate may be selected in additional consideration of shift stages to which shifting is impossible based on the system characteristics of an automatic transmission or the DCT.

Hereinafter, a shift control process according to an exemplary embodiment of the present invention will be described by stages with reference to FIG. 4.

First, a controller may be configured to acquire in real-time information regarding the rotation speed of the transmission input shaft, i.e., the transmission input speed (or motor speed) sensed by a sensor while the vehicle is being driven. Additionally, the controller may be configured to determine a basic shift pattern based on the vehicle speed when the accelerator pedal is disengaged (accelerator pedal-off), and detect a brake input by a driver (S11).

Particularly, the controller may be configured to sense from a signal value of a Brake Pedal Sensor (BPS) whether the brake pedal is engaged (brake pedal-on) to determine a driver brake input (e.g., detect pressure applied to the brake pedal). When no brake pedal operation is detected, similarly to a related art, a target shift stage that corresponds to a current vehicle speed may be selected while the vehicle is being driven based on the basic shift pattern, and the shift stage may be adjusted into the target shift stage (S13). Thus, continuous sequential shift may be performed instead of skip shift.

Furthermore, when a brake input is detected based on the brake pedal operation, the driving situation and driver's tendency may be determined, and whether the determination results correspond to the allowable conditions of skip shift may be determined (S12). When the determination results do not correspond to the allowable conditions of skip shift, similarly to a related art, the target shift stage that corresponds to the current vehicle speed may be selected during the driving based on the basic shift pattern, and the shift stage may be adjusted into the target shift stage (S13). Thus, continuous sequential shift may be performed instead of skip shift.

Additionally, when the determination results correspond to the allowable conditions of skip shift, the current transmission input speed may be compared with the maximum input speed of the transmission designated by each shift stage, and shiftable shift stage candidates in which the current transmission input speed falls within the maximum input speed of the transmission may be determined (S14). Then, shift stages to which the shift is impossible from the current shift stage based on the characteristics of the automatic transmission or the DCT may be determined among the shift stage candidates, and then the shift stage to which the shift is impossible may be additionally removed to select a final shiftable shift stage candidate (S15).

As described above, when the shiftable shift stage candidates are selected, the target shift stage according to the signal value of the BPS, i.e., target shift stage according to the braking demand (e.g., brake pedal opening degree and brake pedal operation depth) may be selected (S16). In particular, when the braking demand of a driver is insignificant, the target shift stage may become a shift stage shifted from the current shift stage by one stage shift. However, as the braking demand of a driver increases, the target shift stage may be skip shift in which two or more stages are changed. In other words, as the depth of the brake pedal operation increases, the target shift stage may be selected such that more plurality of skip shifts can be performed.

As described above, when the target shift stage is selected, the transmission may be operated to be shifted to the target shift stage (S 17). For the more detailed description of the allowable conditions of the skip shift, when a driver has a tendency to rapidly accelerate and decelerate a vehicle and when the current driving situation corresponds to downtown driving, the skip shift may be allowed.

Figure 5:
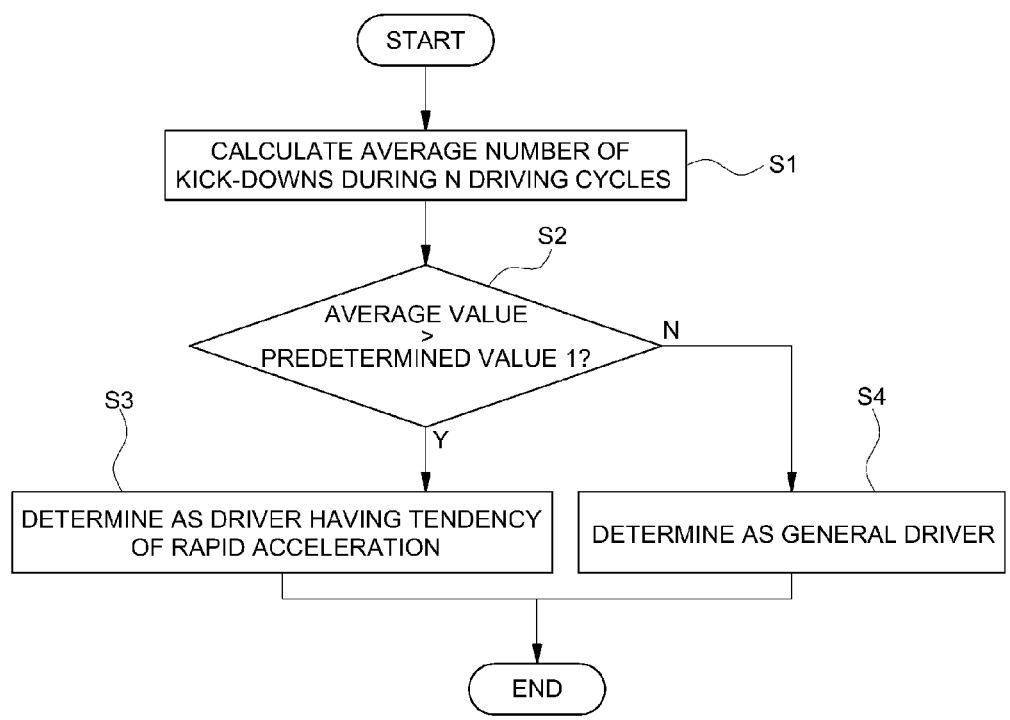
FIG. 5 is an exemplary flowchart illustrating a process of determining a driver's tendency of rapid acceleration according to an exemplary embodiment of the present invention.
Figure 6:
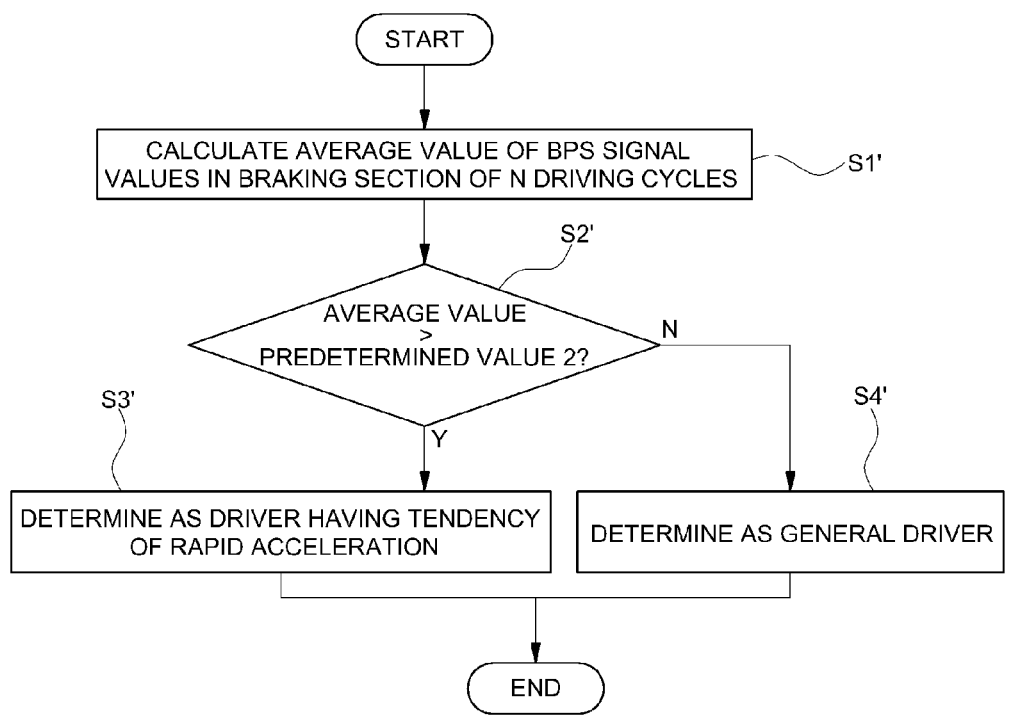
FIG. 6 is an exemplary flowchart illustrating a process of determining a driver's tendency of rapid deceleration according to an exemplary embodiment of the present invention.

FIG. 5 is an exemplary flowchart illustrating a process of determining a driver's tendency of rapid acceleration according to an exemplary embodiment of the present invention. FIG. 6 is an exemplary flowchart illustrating a process of determining a driver's tendency of rapid deceleration according to an exemplary embodiment of the present invention.

First, as shown in FIG. 5, the number of kick-downs (e.g., number of engagements of pedal) during the past N driving cycles may be counted, and when the average number of the kick-downs is greater than a predetermined set value 1, a driver may be determined as a driver having a tendency of rapid acceleration (S1, S2, and S3). Additionally, as shown in FIG. 6, when the average value of BPS signal values (e.g., depth of brake pedal operation and brake pedal opening degree) in a braking section during the past N driving cycles is greater than a predetermined set value 2, a driver may be determined as a driver having a rapid deceleration tendency (S1', S2', and S3'). In the determination process of FIGS. 5 and 6, the oldest driving cycle value may be abandoned, and a new driving cycle value may be newly added to form a buffer. Thus, the average of BPS signal values and the average number of kick-downs obtained during the predetermined N driving cycles may be used.

Figure 7:
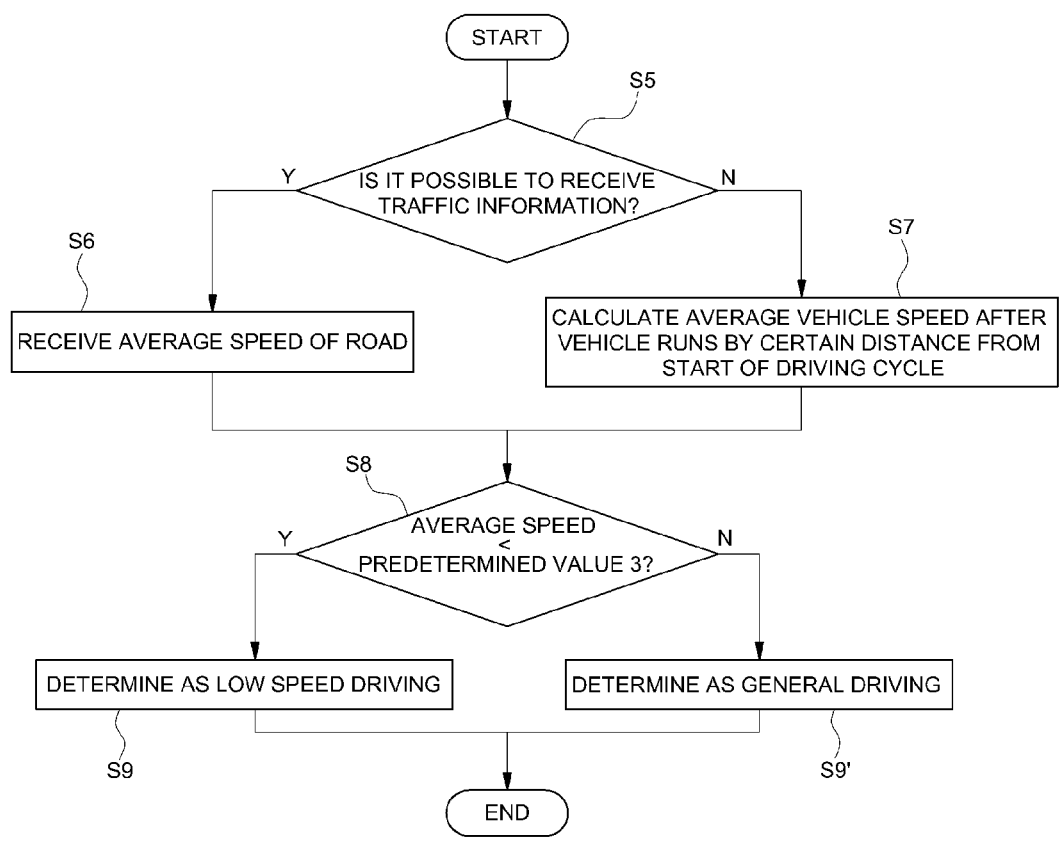
FIG. 7 is an exemplary flowchart illustrating a process of determining a downtown driving state according to an exemplary embodiment of the present invention.

Moreover, FIG. 7 is an exemplary flowchart illustrating a process of determining a downtown driving that is a skip shift allowable condition according to an exemplary embodiment of the present invention. The skip shift may be allowed during the low speed driving such as downtown driving. In particular, when road information may be received from the exterior using a navigation device of a vehicle, the average running speed of a road on which a vehicle runs may be received to determine whether a vehicle runs in a downtown driving mode (S5 and S6), that is, based on the speed a driving mode may be determined.

In particular, when the average speed is less than a predetermined set value 3, a vehicle may be determined as running in downtown (S8 and S9). When no device such as a navigation device is present which may receive the road information, the average running speed may be calculated after a vehicle starts running (S5 and S7). When the average speed is less than the predetermined value 3, a vehicle may be determined as running in a downtown driving mode. Thus, in this exemplary embodiment, when a driver has a rapid acceleration or deceleration tendency and the current driving situation is a downtown driving mode, the skip shift may be allowed.

Consequently, in this exemplary embodiment, the recovery rate of energy and the fuel efficiency may be improved through the skip shift. Particularly, a busy shift may be prevented by limitedly allowing the skip shift to a shift stage in which there is no loss in fuel efficiency upon reaccelerating based on the driver's tendency and the road driving situation. Accordingly, a shift control method for a hybrid vehicle according to an exemplary embodiment of the present invention has effects of increasing the recovery rate of regenerative energy, improving the fuel efficiency, and minimizing the loss of the fuel efficiency upon reaccelerating after braking, by determining driving situation such as highway driving and downtown driving and driver's tendency such as rapid acceleration and thus allowing a limited skip shift.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A shift control method for a hybrid vehicle, comprising:
   acquiring, by a controller, in real-time information regarding a transmission input speed while the vehicle is being driven, and sensing a brake pedal operation;
   detecting, by the controller, whether a road driving situation or a driver tendency corresponds to a skip shift allowable condition when the brake pedal operation is sensed;
   selecting, by the controller, a target shift stage to which a skip shift of two or more stages is performed from a current shift stage based on the transmission input speed in real-time, when the road driving situation or the driver tendency corresponds to the skip shift allowable condition; and
   operating, by the controller, a transmission to shift to the selected target shift stage.

2. The shift control method of claim 1, wherein the number of kick-downs during past N driving cycles is counted, and when the driver tendency is a rapid acceleration in which the average number of kick-downs is greater than a predetermined value 1, the skip shift allowable condition is set to allow the skip shift.

3. The shift control method of claim 1, wherein when the driver tendency is a rapid deceleration in which an average value of the depths of the brake pedal operation in a braking section sensed using a sensor during past N driving cycles is greater than a predetermined value 2, the skip shift allowable condition is set to allow the skip shift.

4. The shift control method of claim 1, wherein when a vehicle is being driven at a low speed in which an average running speed on a road on which a vehicle is traveling is less than a predetermined value 3, the skip shift allowable condition is set to allow the skip shift.

5. The shift control method of claim 4, wherein the average running speed on the road is received through an in-vehicle device, and is compared with the predetermined value 3.

6. The shift control method of claim 4, wherein the average running speed of a vehicle is calculated after a vehicle starts running, and is compared with the predetermined value 3.

7. The shift control method of claim 1, wherein the selecting of the target shift stage includes while a maximum transmission input speed at which the transmission is shiftable to a corresponding shift stage by each shift stage is designated:
   selecting, by the controller, shift stage candidates in which the transmission input speed in real-time falls within the maximum transmission input speed; and
   selecting, by the controller, a target shift stage based on the depth of the brake pedal operation from the shift stage candidates.

8. The shift control method of claim 7, after the selecting of the shift stage candidates in which the transmission input speed in real-time falls within the maximum transmission input speed, includes:
- determining, by the controller, shift stages to which the shift is impossible from a current shift stage based on the characteristics of an automatic transmission or Double Clutch Transmission (DCT);
- additionally removing, by the controller, from the shift stage candidates, the shift stages to which the shift is impossible, to select final shift candidates; and
- selecting, by the controller, a target shift stage from the final shift stage candidates.

9. A shift control system for a hybrid vehicle, comprising:
- a memory configured to store program instructions; and
- a processor configured to execute the program instructions, the program instructions when executed configured to:
  - acquire in real-time information regarding a transmission input speed while the vehicle is being driven, and sensing a brake pedal operation;
  - detect whether a road driving situation or a driver tendency corresponds to a skip shift allowable condition when the brake pedal operation is sensed;
  - select a target shift stage to which a skip shift of two or more stages is performed from a current shift stage based on the transmission input speed in real-time, when the road driving situation or the driver tendency corresponds to the skip shift allowable condition; and
  - operate a transmission to shift to the selected target shift stage.

10. The shift control system of claim 9, wherein the number of kick-downs during past N driving cycles is counted, and when the driver tendency is a rapid acceleration in which the average number of kick-downs is greater than a predetermined value 1, the skip shift allowable condition is set to allow the skip shift.

11. The shift control system of claim 9, wherein when the driver tendency is a rapid deceleration in which an average value of the depths of the brake pedal operation in a braking section sensed using a sensor during past N driving cycles is greater than a predetermined value 2, the skip shift allowable condition is set to allow the skip shift.

12. The shift control system of claim 9, wherein when a vehicle is being driven at a low speed in which an average running speed on a road on which a vehicle is traveling is less than a predetermined value 3, the skip shift allowable condition is set to allow the skip shift.

13. The shift control system of claim 12, wherein the average running speed on the road is received through an in-vehicle device, and is compared with the predetermined value 3.

14. The shift control system of claim 12, wherein the average running speed of a vehicle is calculated after a vehicle starts running, and is compared with the predetermined value 3.

15. A non-transitory computer readable medium containing program instructions executed by a controller, the computer readable medium comprising:
- program instructions that acquire in real-time information regarding a transmission input speed while a hybrid vehicle is being driven and sensing a brake pedal operation;
- program instructions that detect whether a road driving situation or a driver tendency corresponds to a skip shift allowable condition when the brake pedal operation is sensed;
- program instructions that select a target shift stage to which a skip shift of two or more stages is performed from a current shift stage based on the transmission input speed in real-time, when the road driving situation or the driver tendency corresponds to the skip shift allowable condition; and
- program instructions that operate a transmission to shift to the selected target shift stage.

16. The non-transitory computer readable medium of claim 15, wherein the number of kick-downs during past N driving cycles is counted, and when the driver tendency is a rapid acceleration in which the average number of kick-downs is greater than a predetermined value 1, the skip shift allowable condition is set to allow the skip shift.

17. The non-transitory computer readable medium of claim 15, wherein when the driver tendency is a rapid deceleration in which an average value of the depths of the brake pedal operation in a braking section sensed using a sensor during past N driving cycles is greater than a predetermined value 2, the skip shift allowable condition is set to allow the skip shift.

18. The non-transitory computer readable medium of claim 15, wherein when a vehicle is being driven at a low speed in which an average running speed on a road on which a vehicle is traveling is less than a predetermined value 3, the skip shift allowable condition is set to allow the skip shift.

* * * * *